Figure 1:
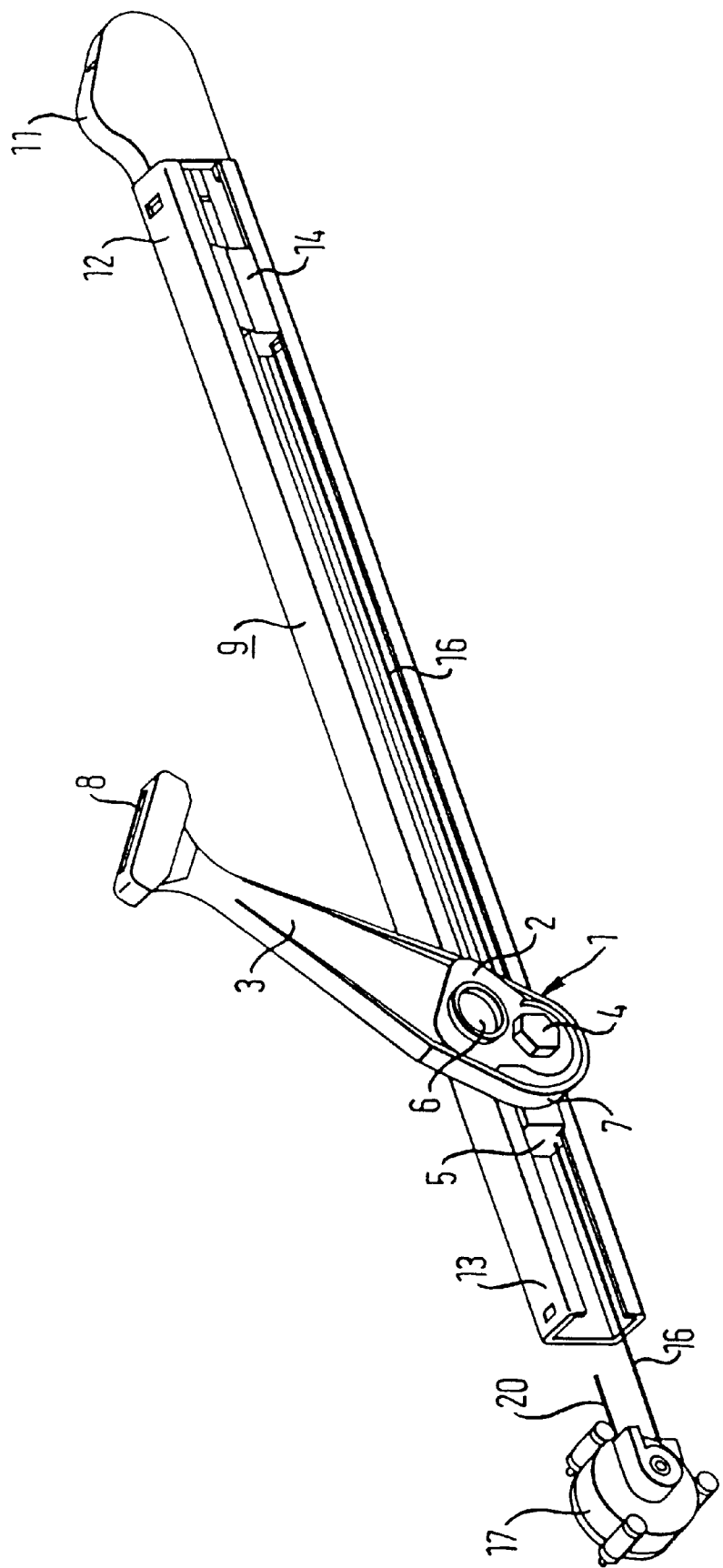

United States Patent
Pleyer et al.

[11] Patent Number: 5,924,772
[45] Date of Patent: *Jul. 20, 1999

[54] SAFETY BELT SYSTEM

[75] Inventors: Matthias Pleyer, Senden; Wolfgang Schmid, Illerkirchberg; Axel Botsch, Heidenheim, all of Germany

[73] Assignee: Takata (Europe) Vehicle Safety Technology GmbH, Ulm, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,153

[22] Filed: Apr. 21, 1997

[30] Foreign Application Priority Data

Apr. 19, 1996 [GB] United Kingdom .............. 196 15 655

[51] Int. Cl.⁶ .................................................. B60R 22/24
[52] U.S. Cl. ........................... 297/473; 280/804; 297/468
[58] Field of Search ................................... 297/468, 473; 280/801.2, 804, 802, 803, 805

[56] References Cited

U.S. PATENT DOCUMENTS

| | | | |
|---|---|---|---|
| 3,727,977 | 4/1973 | Gmeiner et al. | 297/473 X |
| 3,833,239 | 9/1974 | Coenen | 280/804 |
| 4,159,848 | 7/1979 | Manz et al. | 280/804 |
| 4,258,933 | 3/1981 | Takada | 280/804 |
| 4,317,584 | 3/1982 | Takata | 280/804 |
| 4,909,539 | 3/1990 | Morner | 280/804 |
| 4,923,214 | 5/1990 | Siegrist et al. | 297/473 |
| 5,004,268 | 4/1991 | Yamamoto | 280/804 |
| 5,031,961 | 7/1991 | Isern | 297/473 |
| 5,205,589 | 4/1993 | Watanabe | 280/804 |
| 5,226,697 | 7/1993 | Borlinghaus et al. | 297/473 X |
| 5,294,184 | 3/1994 | Blake | 297/473 |

*Primary Examiner*—Peter R. Crown
*Attorney, Agent, or Firm*—Foley & Lardner

[57] ABSTRACT

Safety belt system for seats of a motor vehicle displaceable in the longitudinal direction of the vehicle, the belt system comprising a belt (25) which can be unwound from a reel, an upper deflection fitting or attachment fitting for the belt (25) and a lower attachment fitting (2) for the end of the belt (25) remote from the reel arranged at the side relative to the associated seat, with the lower attachment fitting being secured to the vehicle so that it is capable of displacement in the longitudinal direction of the vehicle, wherein, in order to ensure a comfortable grasping position of the safety belt (25) in each position of the vehicle seat, the displacement position of the lower attachment fitting (2) is controlled from the associated vehicle seat in dependence on its longitudinal position.

23 Claims, 4 Drawing Sheets

SAFETY BELT SYSTEM

DESCRIPTION

The present invention relates to a safety belt system for seats of a motor vehicle displaceable in the longitudinal direction of the vehicle comprising a belt which can be unwound from a reel, an upper deflection fitting or attachment fitting for the belt and a lower attachment fitting for the end of the belt remote from the reel arranged at the side relative to the associated seat, with the lower attachment fitting being secured to the vehicle so that it is capable of displacement in the longitudinal direction of the vehicle.

With two-doored motor vehicles in particular, the safety belt is attached to the motor vehicle relatively far to the rear with respect to the associated vehicle seat. The grasping of the safety belt in order to put on the latter is accordingly complicated because a large rotation of the body is required. This problem is made more acute the further the associated seat is displaced forwardly.

Thus devices are already known which engage the not yet put on safety belt and move it into a more comfortable grasping position relative to the vehicle seat. These known devices operate with a grasper arm which is driven by an electric motor and which automatically enters into action on using the vehicle seat. This solution is relatively complicated, and thus cost-intensive, and liable to break down.

A safety belt system with a lower mounting fitting for the safety belt is known from DE-PS 35 14 769 C2 in which the lower attachment fitting is secured to the vehicle so that it is displaceable in the longitudinal direction of the vehicle. The displacement takes place in this arrangement manually by the user of the vehicle seat after having put on the safety belt and has the purpose of adjusting the lower attachment fitting relative to the vehicle in dependence on the seat position and the body build of the user of the seat. Easier grasping of the safety belt is neither intended by this arrangement nor adequately ensured because the displacement of the lower attachment fitting first takes place after the safety belt has been put on. The lower attachment fitting is thus located in a position before the belt is put on which was determined by the previous user of the vehicle seat and is consequently not adapted to the current use.

The invention is based on the object of so further developing a safety belt system of the initially named kind that these disadvantages do not arise. In particular, the safety belt should always be brought into a comfortable grasping position before the safety belt is put on.

This object is satisfied in that the displacement position of the lower attachment fitting is controlled via the associated vehicle seat in dependence on its longitudinal position.

By controlling the displacement position of the lower attachment fitting in dependence on the longitudinal position of the associated vehicle seat it is ensured that the lower attachment fitting moves with the vehicle seat and is thus always located in the same position relative to the vehicle seat. The grasping of the safety belt is thus favourably possible in the same way in every seat position so that the safety belt can also be easily grasped when the vehicle seat is in the frontmost position. Through the control of the displacement position by the associated vehicle seat itself, the advantage automatically results that the safety belt is already moved into a comfortable grasping position on adjustment of the vehicle seat prior to putting on the belt.

The belt is presented in an even more comfortable grasping position by a presentation arm by which the belt is guided, with the presentation arm being pivoted to the lower attachment fitting and thus movable with it. For this purpose the presentation arm is in particular inclined towards the front side of the associated seat. Only a small body rotation is necessary, if at all, in order to grasp the safety belt which is always held in the same presentation position relative to the vehicle seat in this way.

In accordance with a development of the invention the lower attachment fitting is mounted on a sliding block which is displaceably guided in a rail. In this way a reliable displacement of the attachment fitting is achieved while nevertheless ensuring an adequately firm anchorage of the latter to the vehicle.

For the additional fixing of the sliding block in the rail in the event of a loading of the safety belt, such as occurs in particular during an accident, the sliding block is provided at its upper side with a latching nose which is formed for engagement into corresponding latch recesses provided at the rail. In this way a reliable and particularly stable blocking of the lower attachment fitting is brought about in the case of an accident. In order to ensure problemless displacement of the sliding block in the rail when the belt is not loaded, a spring element can additionally be provided between the sliding block and the rail which loads the sliding block into its unlatched position.

The displacement of the sliding block in the rail can take place, in accordance with the invention, for example via a follower present on the vehicle seat or via a Bowden cable controlled by the vehicle seat. In both cases the sliding block can be loaded by a spring element in the direction towards its one end position. When using a Bowden cable, a continuous tension of the draw cable is ensured thereby. When using a follower the latter can be so arranged that it only acts on the sliding block in the direction opposite to the spring force, so that a displacement of the sliding block against the spring force is not blocked by the follower.

This second embodiment is in particular advantageous when the vehicle seat associated with the safety belt system of the invention has a backrest which can be pivoted downwardly towards the seat surface, and when the lower attachment fitting is automatically displaced during the downward pivoting of the backrest into its end position adjacent to the upper attachment or deflection fitting. For this purpose an adjustment element which acts on the sliding block can be provided in accordance with a development of the invention. In particular a Bowden cable can be provided which acts on the sliding block in the direction opposite to the spring force.

Through the displacement of the lower attachment fitting into the rear end position during downward pivoting of the backrest, the access to climb through to the rear seat bench is advantageously freed in a two-doored vehicle. That is to say, when the seat back is pivoted downwardly, the safety belt is located essentially in the same position as in a customary safety belt system without a displaceable lower attachment fitting. On making the backrest upright, the lower attachment fitting is then again displaced into its position in the rail corresponding to the seat position of the associated vehicle seat, so that the belt is again presented in a comfortable grasping position.

For the displacement of the lower attachment fitting into its end position which frees access to the rear, a second sliding block can be provided, in accordance with a further development of the invention, at the side of the first sliding block remote from the upper attachment or deflection fitting and can be displaceable in dependence on the pivotal position of the backrest. The automatic displacement of the second sliding block is so contrived that it is located remote from the upper attachment or deflection fitting when the backrest is upright and is located in its end position close to the attachment or deflection fitting when the backrest is pivoted downwardly. When the backrest is upright, the first sliding block can thus move into its position specified by the seat position of the associated vehicle seat, whereas on downward pivoting of the backrest it is moved along by the second sliding block which is moved rearwardly by the backrest and is displaced together with the second sliding block into the end position which frees the access to the rear.

The displacement of the second sliding block can take place via a Bowden cable which can be actuated via the backrest. The sliding block is thereby preferably loaded by a spring element in the direction towards the end position remote from the upper attachment or deflection fitting. Through this design it is ensured that the Bowden cable which displaces the lower deflection fitting into its end position permitting access to the rear is always tensioned.

Figure 2:
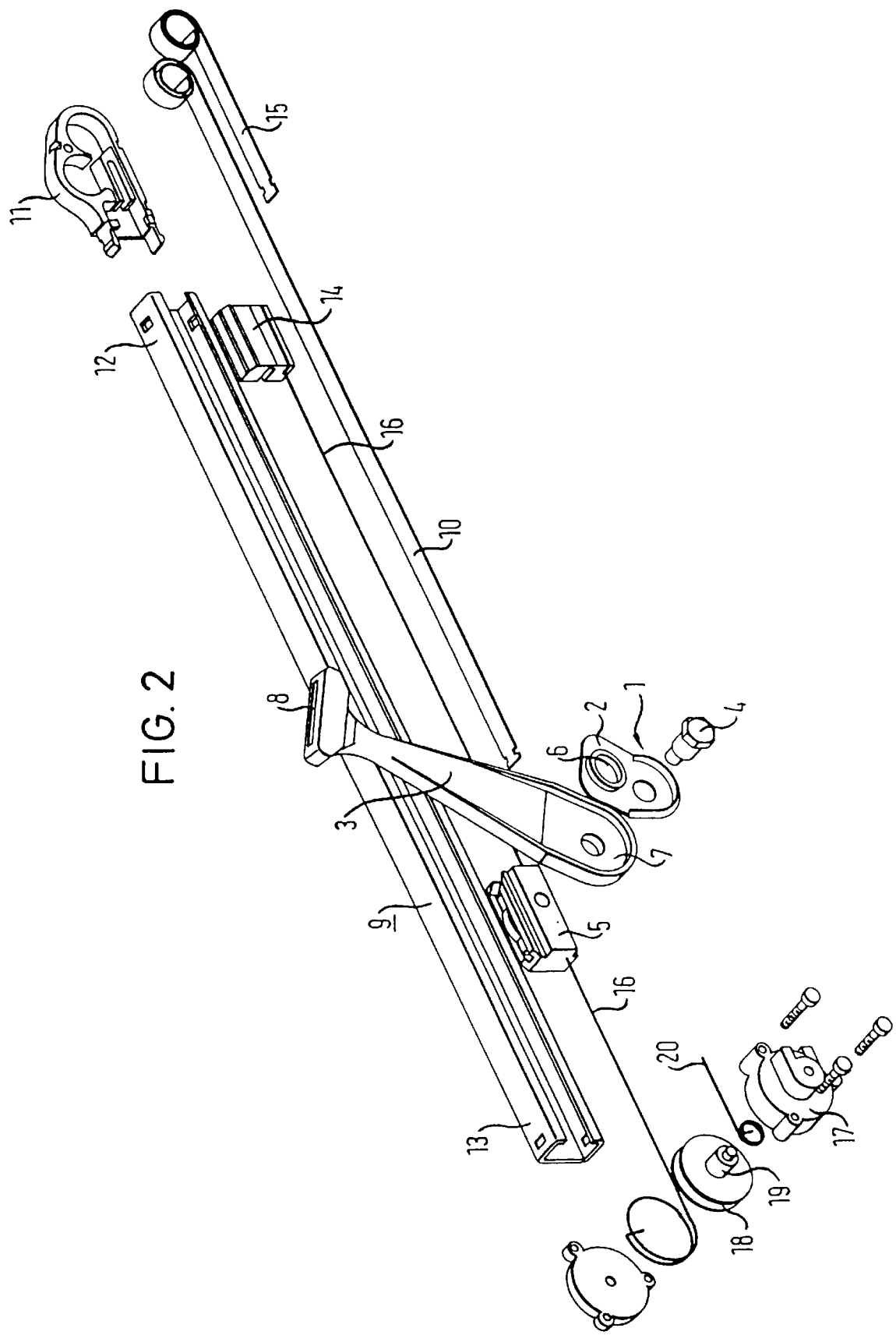
Figure 3:
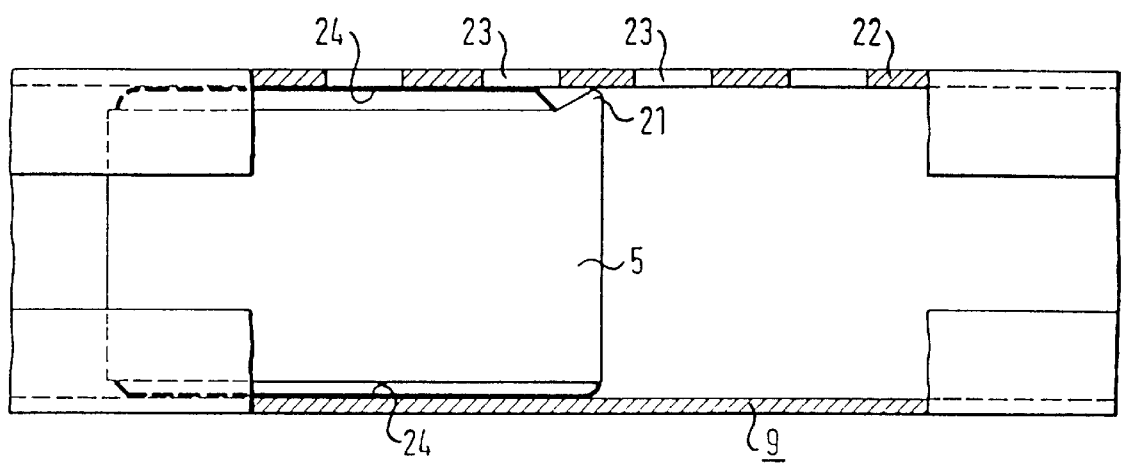
Figure 4:
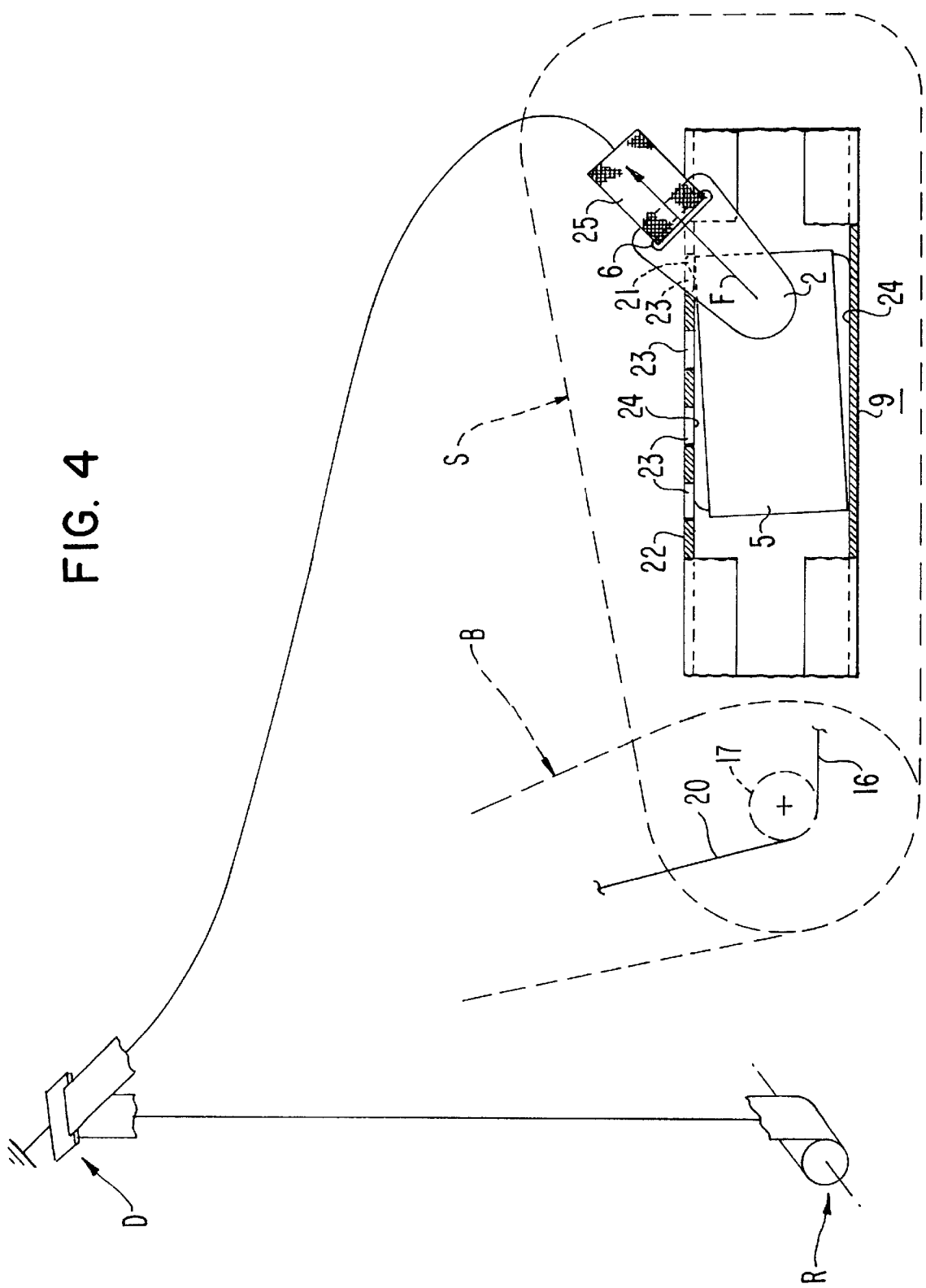

An embodiment of the invention is shown in the drawing and will be described in the following. There are shown in each case:

FIG. 1 a perspective side view of the arrangement of the lower attachment fitting, FIG. 2 an exploded illustration of the subject of FIG. 1, FIG. 3 a partly sectioned side view of a section of the rail of FIG. 1 with the sliding block unloaded and in an enlarged illustration, and FIG. 4 the subject of FIG. 3 with the sliding block loaded in the same illustration.

The FIGS. 1 and 2 show the arrangement of the lower attachment fitting 1 of a safety belt system of the invention without showing the safety belt itself. The lower attachment fitting 1 has an anchor plate 2 which is secured together with a presentation arm 3 by means of a bolt 4 to a first sliding block 5. The anchor plate 2 has a mount 6 for the end of the safety belt remote from the reel and is fitted into the fixed end 7 of the presentation arm 3. The presentation arm 3 has a passage 8 for the safety belt and is arranged, together with the anchor plate 2 inclined, relative to the sliding block 5 so that the safety belt guided through the passage 8 is presented towards the front side of the associated vehicle seat.

The sliding block 5 is displaceably guided between two end positions in a rail 9 of c-shaped cross-section which is mounted to the vehicle to the side of the associated vehicle seat in the direction of displacement of the latter. With a customary motorcar the rail 9 is for example secured to the inner side of the corresponding sill. A spiral band spring 10 acts on the sliding block 5 and is anchored at its other end in a housing 11 present at the front end 12 of the rail 9 and is accommodated by the latter. A follower mounted to the associated vehicle seat which acts at the front side on the sliding block 5 acts against the force of the spring 10 which loads the sliding block 5 in the direction towards the front end 12 of the rail 9. In the frontmost position of the vehicle seat this follower permits a displacement of the sliding block 5 up to and into its frontmost end position, whereas it moves the sliding block 5 into its rear end position at the rear end of the rail 9 when the seat is moved into the rearmost position.

Referring also to FIG. 4, a second displaceably guided sliding block 14 is provided in the rail 9 and is arranged further forwardly in the rail 9 than the first sliding block 5. The second sliding block 14 is loaded by a second spiral band spring 15 likewise in the direction towards the front end 12 of the rail and is again anchored in the housing 11 at its other end and accommodated by the housing. In the opposite direction a Bowden cable 16 acts on the second sliding block 14 and is actuated via the backrest B of the associated vehicle seat S, which is not shown here. In order to take account of the different paths of movement of the vehicle backrest and of the second sliding block 14, a gearing device 17 is provided with two rollers 18 and 19 of different diameters which are connected to one another in force-transmitting manner. The Bowden cable 16 can be wound onto one of the rollers and a second Bowden cable 20 can be wound onto the other roller. The second Bowden cable is secured at its other end to the backrest of the associated vehicle seat.

In place of the follower arranged on the vehicle seat, a further Bowden cable can also be provided for the displacement of the first sliding block 5 and act on the first sliding block 5 against the force of the first spiral band spring 10. A gearing device can also be provided here.

In both cases the first sliding block 5 is displaced in the rail 9 together with the lower attachment fitting 2 and the presentation arm 3 for the safety belt by the associated vehicle seat in dependence on its seat position, so that the safety belt is always presented in the same comfortable grasping position relative to the vehicle seat. On moving the vehicle seat rearwardly toward the belt reel R and upper attachment fitting D, either the follower, or the Bowden cable controlled by the vehicle seat, acts against the force of the spiral band spring 10 on the sliding block 5 and displaces the latter to the rear end 13 of the rail 9. The sliding block 5 moves in the direction towards the front end 12 of the rail 9 when the associated vehicle seat is moved forwardly to the extent that is permitted by the follower or the Bowden cable. In the frontmost seat position the sliding block 5 is also located in its frontmost position.

The second sliding block 14 is located, when the seat backrest of the associated vehicle seat is upright, in its frontmost position at the front end 12 of the rail 9. When the backrest is pivoted downwardly, the Bowden cable 16 is actuated via the gearing device 17 by the Bowden cable 20, which is in turn actuated by the backrest. The second sliding block 14 is thereby moved against the force of the spiral band spring 15 in the direction towards the rear end 13 of the rail 9 until it strikes the first sliding block 5. When the backrest is pivoted further downwardly the second sliding block 14 moves the first sliding block 5 with it and moves together with the latter into the common, rear, end position at the rear end of the rail 9. The safety belt which is guided by the passage 8 of the presentation arm 3 is thereby moved out of the way of the access region of the associated vehicle door, so that it is easier to climb onto a rear seat bench. When the backrest is pivoted downwardly, the safety belt is thereby located in practically the same position as in a customary safety belt system without the displaceable lower attachment fitting 2.

The FIGS. 3 and 4 show an enlarged illustration of a section of the rail 9 of the invention and of the first sliding block 5 arranged in the rail. This is a variant of the embodiment shown in FIGS. 1 and 2 in which the sliding block is provided with an upwardly pointing latch nose 21. The rail 9 which is of c-shaped cross-section has corresponding latch recesses 23 in its upper limb 22 into which the nose 21 of the first sliding block 5 can latch. The latched position is shown in FIG. 4.

Two leaf springs 24 are provided between the rail 9 and the sliding block 5 in order to keep the sliding block 5 in the unlatched position shown in FIG. 3 as long as the attachment fitting 2 is not loaded by the safety belt 25, such as would in particular occur during an accident. The two leaf springs 24 are in each case pivotally connected at one end to the sliding block 5 and clamped to the other end between the rail 9 and the sliding block 5. The sliding block 5 is thereby reliably held in normal operation in its unlatched position.

During an accident a force F is transmitted to the lower deflection fitting 2 of the safety belt 25 and always has an upwardly directed component. Through this force F the sliding block 5 is turned in the rail 9 against the force of the springs 24, so that the latching nose 21 latches into one of the latch recesses 23 of the rail 9. The sliding block 5 is thereby reliably blocked on loading of the lower deflection fitting 2 against displacement in the rail 9, so that the lower deflection fitting 2 is likewise fixed in the corresponding position.

On the whole one thereby obtains a simple and reliable safety belt system which ensures, through automatic displacement of the lower attachment fitting for the end of the seat belt remote from the reel, that the safety belt is presented in the same comfortable grasping position for each position of the seat. In particular, with a three-point belt with an upper attachment or deflection fitting, the belt is thereby drawn to the side of a seated person into a position in which it can be comfortably grasped. During this, the automatic resetting of the belt during the forward pivoting of the seat backrest additionally ensures that the access opening to the rear seat bench is automatically kept free from the safety belt, and indeed independently of the respective seat position of the associated vehicle seat. The automatically adjustable lower attachment fitting can however also be used with a two-point belt.

The Entire contents of German Patent Application 196 15 655.6, filed Apr. 19, 1996, are hereby incorporated by reference.

Reference numeral list 1 lower attachment fitting
2 anchor plate
3 presentation arm
4 bolt
5 first sliding block
6 mount
7 end of 3
8 passage
9 rail
10 spiral band spring
11 housing
12 front end of 9
13 rear end of 9
14 second sliding block
15 second spiral band spring
16 first Bowden cable
17 translation device
18 roller
19 roller
20 second Bowden cable
21 latch nose
22 upper limb of 9
23 latch recess
24 leaf spring
25 safety belt
F force

We claim:

1. A safety belt system for a vehicle having a seat that is displaceable in opposite longitudinal directions of the vehicle, the safety belt system comprising:

a belt adapted for winding and unwinding with respect to a reel, an upper deflection fitting adapted to be mounted to the vehicle for redirecting movement of the belt, a lower attachment fitting adapted to be supported with respect to the vehicle for connecting to an end of the belt remote from the reel, the lower attachment fitting being adapted for relative displacement with respect to the seat and the vehicle in the longitudinal directions of the vehicle, and a displacer engaging the lower attachment fitting and adapted to be connected to the seat, wherein displacement of the lower attachment fitting is responsive to the displacing of the seat.

2. The safety belt system in accordance with claim 1, further comprising:

a presentation arm guiding the belt, the presentation arm being pivotally connected to the lower attachment fitting and displaceable therewith.

3. The safety belt system in accordance with claim 2, wherein the presentation arm is forwardly inclined in the longitudinal direction.

4. The safety belt system in accordance with claim 1, further comprising:

a sliding block connected to the lower attachment fitting, the sliding block being displaceably guided in a rail adapted to be mounted to the vehicle.

5. The safety belt system in accordance with claim 4, wherein the sliding block includes a latching nose adapted for engaging a latch recess provided on the rail at times when the belt loads the lower attachment fitting.

6. The safety belt system in accordance with claim 4, wherein the displacer includes a follower adapted for moving with the vehicle seat, the follower displacing the sliding block.

7. The safety belt system in accordance with claim 4, wherein the displacer includes a Bowden cable adapted for moving with the vehicle seat, the Bowden cable displacing the sliding block.

8. A safety belt system for a vehicle having a seat that is displaceable in opposite longitudinal directions of the vehicle, the safety belt system comprising:

a belt adapted for winding and unwinding with respect to a reel, an upper deflection fitting adapted to be mounted to the vehicle for redirecting movement of the belt, a lower attachment fitting adapted to be supported with respect to the vehicle for connecting to an end of the belt remote from the reel, the lower attachment fitting being adapted for relative displacement with respect to the vehicle in the longitudinal directions of the vehicle, a sliding block being connected to the lower attachment fitting, the sliding block being displaceably guided in a rail and including a latching nose adapted for engaging a latch recess provided on the rail at times when the belt loads the lower attachment fitting, the rail being adapted to be mounted to the vehicle, a spring element extending between the sliding block and the rail, the spring element biasing the gliding block toward an unlatched position, and a displacer engaging the lower attachment fitting and adapted to be connected to the seat, wherein displacement of the lower attachment fitting is responsive to the displacing of the seat.

9. A safety belt system for a vehicle having a seat that is displaceable in opposite longitudinal directions of the vehicle, the safety belt system comprising:

a belt adapted for winding and unwinding with respect to a reel, an upper deflection fitting adapted to be mounted to the vehicle for redirecting movement of the belt with respect to the vehicle, a lower attachment fitting adapted to be supported with respect to the vehicle for connecting to an end of the belt remote from the reel, the lower attachment fitting being adapted for relative displacement with respect to the vehicle in the longitudinal directions of the vehicle, a sliding block being connected to the lower attachment fitting, the sliding block being displaceably guided in a rail and including a latching nose adapted for engaging a latch recess provided on the rail at times when the belt loads the lower attachment fitting, the rail being adapted to be mounted to the vehicle, a spring element biasing the sliding block toward a first end position with respect to the rail, and a displacer engaging the sliding block and adapted to be connected to the seat, wherein displacement of the lower attachment fitting is responsive to the displacing of the seat.

10. A safety system for a vehicle, the safety system comprising:

a seat adapted for displacing in opposite longitudinal directions of the vehicle, the seat having a seat surface and a backrest which can be pivoted downwardly towards the seat surface, a belt adapted for winding and unwinding with respect to a reel, an upper deflection fitting adapted to be mounted to the vehicle for redirecting movement of the belt with respect to the vehicle, and a lower attachment fitting adapted to be supported with respect to the vehicle for connecting to an end of the belt remote from the reel, and a mechanism extending between the lower attachment fitting and the backrest for automatically displacing the lower fitting attachment in the longitudinal directions of the vehicle to an end position closer to the upper attachment fitting upon downward pivoting of the backrest.

11. The safety system in accordance with claim 10, wherein the mechanism includes an adjustment element connecting the backrest on downward pivoting to a slide block connected to the lower attachment fitting.

12. The safety system in accordance with claim 11, wherein the adjustment element includes a Bowden cable acting on the sliding block, and the mechanism includes a spring element opposing displacement of the sliding block by the Bowden cable.

13. The safety system in accordance with claim 11, further comprising:

a rail guiding displacement of the sliding block, and a second sliding block being guided by the rail, the second sliding block being located at a side of the first sliding block remote from the upper attachment and being displaceable in dependence on the pivoted position of the backrest, wherein the second sliding block is located in an end position remote from the upper attachment fitting when the backrest is upright and is located in an end position close to the upper attachment fitting when the backrest is pivoted downwardly.

14. The safety system in accordance with claim 13, further comprising:

a Bowden cable connecting the backrest and the second sliding block.

15. The safety system in accordance with claim 13, further comprising:

a spring element biasing the second sliding block toward the end position remote from the upper attachment fitting.

16. The safety system in accordance with claim 11, wherein the adjustment element includes a Bowden cable.

17. A system for positioning a safety belt with respect to a seat in a vehicle, the seat being displaceable in opposite longitudinal directions with respect to the vehicle, the system comprising:

an attachment adapted for connecting the safety belt with respect to the vehicle, said attachment being displaceable in the opposite longitudinal directions;

a track guiding displacement of said attachment in the opposite longitudinal directions, said track being adapted to be mounted to the vehicle; and a follower being adapted to be fixed relative to the seat, said follower displacing said attachment in a first one of the opposite longitudinal directions;

wherein said attachment is adapted for relative displacement with respect to the vehicle and to the seat.

18. The system for positioning a safety belt in accordance with claim 17, further comprising:

a spring biasing said attachment in a second one of the opposite longitudinal directions toward said follower, said spring connecting said track and said attachment.

19. A system for positioning a safety belt with respect to a seat in a vehicle, the seat being displaceable in opposite longitudinal directions with respect to the vehicle, the system comprising:

an attachment adapted for connecting the safety belt with respect to the vehicle, said attachment being displaceable in the opposite longitudinal directions;

a track guiding displacement of said attachment in the opposite longitudinal directions, said track being adapted to be mounted to the vehicle; and a Bowden cable extending between the attachment and the seat for displacing said attachment in a first one of the opposite longitudinal directions, said Bowden cable being adapted for pulling said attachment during displacement of the seat in the first one of the opposite longitudinal directions;

wherein said attachment is adapted for relative displacement with respect to the vehicle and to the seat.

20. The system for positioning a safety belt in accordance with claim 19, further comprising:

a spring biasing said attachment in a second one of the opposite longitudinal directions in opposition to tension in said Bowden cable, said spring connecting said track and said attachment.

21. A system for positioning a safety belt with respect to a seat in a vehicle, the seat being displaceable in opposite longitudinal directions with respect to the vehicle and having a seat back pivotal in opposite angular directions with respect to a seat base, the system comprising:

an attachment adapted for connecting the safety belt with respect to the vehicle, said attachment being displaceable in the opposite longitudinal directions;

a track guiding displacement of said attachment in the opposite longitudinal directions, said track being adapted to be fixed relative to the vehicle; and a slider being connected to the seat back and being displaceable along said track in the opposite longitudinal directions, said slider being adapted to be displaced in response to the seat back pivoting relative to the seat base;

wherein said slider limits displacement of said attachment along said track.

22. The system for positioning a safety belt in accordance with claim 21, further comprising:

a first spring biasing said attachment in one of the longitudinal directions toward said slider; and a second spring biasing said slider in the one of the longitudinal directions.

23. The system for positioning a safety belt in accordance with claim 21, further comprising:

a Bowden cable displacing said slider, said Bowden cable being adapted for connecting said slider to the seat back.

* * * * *